United States Patent [19]

Legille et al.

[11] 4,162,784

[45] Jul. 31, 1979

[54] PRESSURE EQUALIZATION APPARATUS AND METHOD

[75] Inventors: Edouard Legille, Luxembourg; Rene N. Mahr, Howald-Hesperange; Carlo Heinz, Luxembourg, all of Luxembourg

[73] Assignee: S.A. des Anciens Etablissements Paul Wurth, Luxembourg

[21] Appl. No.: 770,193

[22] Filed: Feb. 18, 1977

[30] Foreign Application Priority Data

Mar. 8, 1976 [LU] Luxembourg ............................ 74505

[51] Int. Cl.[2] ............................................. F27B 11/12
[52] U.S. Cl. .................... 266/176; 414/199; 266/182; 251/127; 406/83
[58] Field of Search ................ 214/35 R, 18 R, 17 R, 214/17 B, 17 CA; 202/262, 263; 302/35, 64, 59; 181/56, 69; 251/127; 266/176, 182

[56] References Cited

U.S. PATENT DOCUMENTS

| 225,801 | 3/1880 | Crosby | 251/127 |
|---|---|---|---|
| 1,186,067 | 6/1916 | Becker | 181/69 |
| 1,271,758 | 7/1918 | Petito | 251/127 |
| 2,957,727 | 10/1960 | Allen et al. | 302/35 X |
| 3,375,855 | 4/1968 | Deeks | 251/127 |
| 3,665,965 | 5/1972 | Baumann | 251/127 |
| 3,693,812 | 9/1972 | Mahr et al. | 214/35 R |
| 4,007,908 | 2/1977 | Smagghe et al. | 251/127 |

Primary Examiner—Albert J. Makay

[57] ABSTRACT

The pressurization and depressurization of a container, and specifically a feed hopper for materials to be delivered to the interior of a blast furnace, is accomplished with the aid of pressure equalization devices which each include a valve and a wear and sound reducing mechanism immediately downstream of the valve. The wear and sound reduction mechanism subdivides the stream of gas, which may contain entrained particulate matter, into a plurality of jets which are caused to follow a zig-zag trajectory.

9 Claims, 6 Drawing Figures

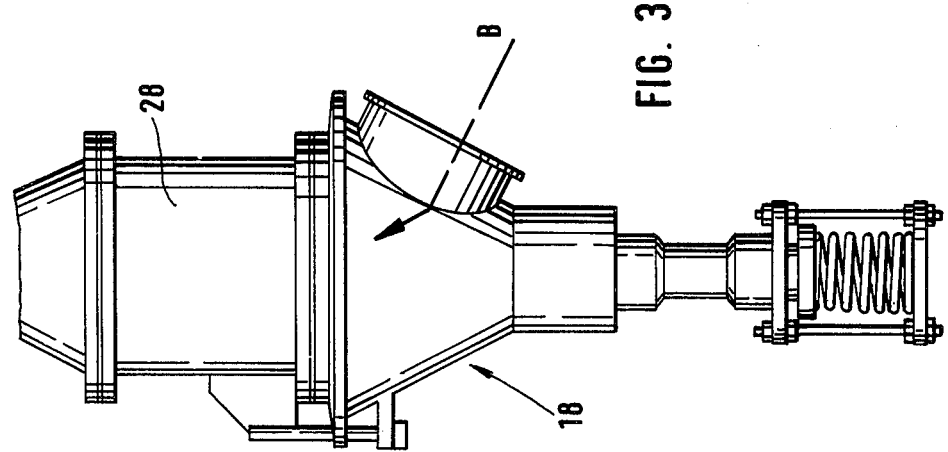
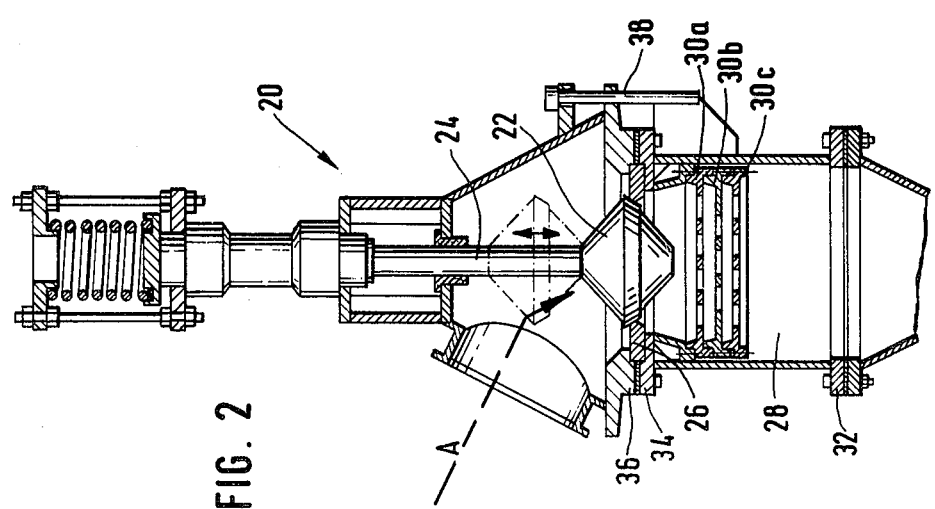

PRESSURE EQUALIZATION APPARATUS AND METHOD

BACKGROUND OF THE INVENTION (1) Field of the Invention

The present invention relates to pressure equalization devices and particularly to apparatus for use in pressurizing or depressurizing feed chambers in which material to be delivered to the interior of a shaft furnace is temporarily stored. More specifically, this invention relates to reducing the wear of apparatus employed in the alternate pressurization and depressurization of a chamber, particularly an intermediate storage hopper in a shaft furnace charging installation, and also to reducing the noise level incident to operation of such apparatus. Accordingly, the general objects of the present invention are to provide novel and improved apparatus and methods of such character.

(2) Description of the Prior Art

Modern blast furnaces operate with high "counter-pressures" in the region of the furnace throat. These throat pressures may reach or exceed a level of 3 kg/cm$^2$. Efficient operation of such high pressure furnaces dictates that the burden or charge on the furnace hearth be replenished while the furnace is in operation and the charging must be accomplished without there being any appreciable pressure loss. In order to accomplish charging of a modern blast furnace, the materials to be deposited on the hearth may be delivered to and temporarily stored in an intermediate feed hopper which functions as a pressure equalizing chamber. U.S. Pat. No. 3,693,812 discloses a furnace charging installation including two intermediate feed hoppers. These intermediate feed hoppers are alternately isolated from the pressure conditions prevailing within the furnace and the ambient atmospheric pressure by sealing flaps or valves. The intermediate feed hoppers are operated in accordance with a predetermined cycle; i.e., while one of the hoppers is at atmospheric pressure and being filled with charge material the other will be at furnace pressure and will be discharging its contents into the furnace. Before refilling of a previously discharged intermediate feed hopper can be undertaken, the pressure in the hopper must be equalized with the ambient atmospheric pressure. Also, before the contents of a refilled feed hopper may be discharged into the furnace the pressure within the hopper must be equalized with that prevailing in the furnace throat. The requisite pressure equalization is typically accomplished by supplying blast furnace gas at furnace pressure to the intermediate feed hoppers and releasing this gas to the atmosphere as appropriate. The delivery of pressurized furnace gas to a feed hopper at atmospheric pressure and the venting of a pressurized intermediate feed hopper to the atmosphere is accomplished through the use of apparatus including pressure equalization valves. An example of a pressure equalization valve suitable for use with a shaft furnace may be found in U.S. Pat. 3,601,357.

The prior art systems for alternately pressurizing and depressurizing intermediate feed hoppers for blast furnaces which operate at high throat counter-pressures have been characterized by comparatively rapid deterioration of components and a high degree of noise during operation. These two problems, although of a different nature, are both caused by the rapid expansion and consequent large pressure drop of the gases which pass through the pressure equalization valves. The amount of wear suffered and the noise emitted is a direct function of the furnace throat pressure, the volume of the chamber in which the pressure is being equalized and the speed at which the equalization valve is actuated. The trend in blast furnace design is to increase furnace throat counter-pressure and also furnace size, increases in furnace size requiring larger intermediate feed hoppers, and thus the wear and noise problems are becoming aggravated. The solution of these problems has for some time been considered essential to permitting further progress in the development of more efficient blast furnaces.

To further discuss the problems of noise generation and wear in pressure equalization systems, when a pressure equalization valve is opened gases at a pressure which may equal or exceed 3 kg/cm$^2$ will pass through the valve and will expand downstream thereof. This expansion causes the gases to be accelerated to a speed which may approach or exceed the speed of sound. Wear is caused by entrained particles of dust which impact against metal parts, particularly the conduit walls downstream of the valve, thereby resulting in erosion of these parts. The noise resulting from the expansion of gases through the equalization valve largely occurs in a turbulence zone which forms immediately downstream of the valve.

While the noise resulting from operation of a pressure equalization system may be reduced to an acceptable level through the use of sound insulation materials and silencers, the problem of erosion has not previously been solved. The use of sound insulation material and silencers increases the cost and complexity of the pressure equalization system and the erosion requires periodic servicing for the purpose of replacing worn parts.

SUMMARY OF THE INVENTION

The present invention overcomes the above-briefly discussed and other deficiencies and disadvantages of the prior art by providing improved techniques and apparatus for equalizing the pressure in a chamber in an uncomplicated and economical manner.

In accordance with a preferred embodiment of the invention, suited for installation in a pressure equalization system associated with the intermediate feed hopper of a blast furnace which operates at a high throat counter-pressure, a movable housing is positioned immediately "downstream" from each of the pressure equalization valves associated with the hopper. Each of these movable housings includes means by which the jet of gas passing through the valves will be subdivided into a plurality of jets of small cross-section.

In one version of the invention the means for subdividing the stream or jet of gas passing through the pressure equalization valve comprises a plurality of serially arranged perforated discs. The perforations in each disc are offset with respect to those in the adjacent disc or discs.

The present invention concentrates the wear or erosion resulting from the discharge of pressurized and particle laden gas from a container in a preselected region. In accordance with the invention this region is within a movable housing mounted downstream from a pressure equalization valve. The components designed to be exposed to the abrasive effects of particles carried by the high speed gases are in the form of perforated discs. These perforated discs are preferably formed of a highly wear-resistant material and are also designed so as to be readily replaceable.

Also in accordance with the present invention, the noise produced by the expansion of a jet of gas downstream from a pressure equalization valve will be considerably reduced by subdividing the jet into a multiplicity of jets of reduced cross-section.

A further important characteristic of the present invention is that the subdivision of a plurality of jets of gas for the purpose of noise reduction is accomplished with the use of the same component or components which absorb the erosive effects of the particulate matter carried by the gases.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 2 is a schematic representation, partly in section, of a pressure equalization system in accordance with a preferred embodiment of the present invention;

FIG. 3 is a side elevation view of the apparatus of FIG. 2 inverted for use in a manner opposite to that represented for the apparatus of FIG. 2;

DESCRIPTION OF THE PREFERRED EMBODIMENT

Figure 1:
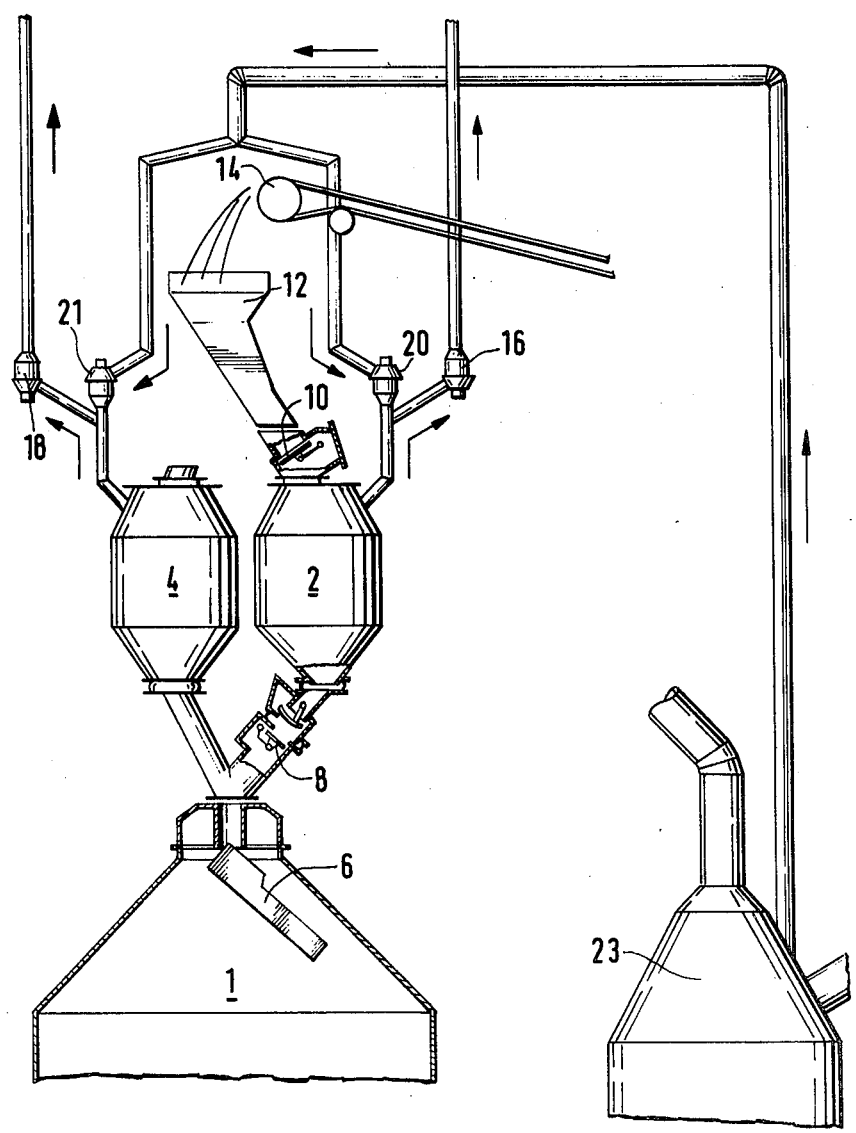
FIG. 1 is a schematic representation of a furnace charging installation including the pressure equalization system of the present invention.

With reference to the drawing, FIG. 1 depicts the application of the present invention to a bell-less blast furnace charging installation of the type disclosed in aforementioned U.S. Pat. No. 3,693,812. It will, however, be understood that the present invention is also applicable to other uses including incorporation in a prior art furnace charging installation of the type which employs conventional charging bells. In FIG. 1 the blast furnace is indicated at 1. The charge material or burden which is to be delivered to the hearth of the furnace will be delivered to and temporarily stored in a pair of intermediate feed hoppers 2 and 4. Material released from the feed hoppers 2 and 4 is delivered, via a central feed channel, to a rotatable and angularly adjustable charge distribution chute 6 located within furnace 1. Each of feed hoppers 2 and 4 is designed as a pressure equalization chamber. Referring to feed hopper 2, a lower sealing valve 8 and an upper sealing valve 10 are associated therewith and hopper 4 will be provided with similar valves. When the upper sealing valve 10 is in the open position, and the pressure within the feed hopper is thus equal to atmospheric pressure, charge material may be introduced into the feed hopper via a movable hopper 12 which is in turn fed from a conveyor 14.

Pressure equalization devices 16 and 18 are respectively provided for the purpose of establishing communication between the interior of feed hoppers 2 and 4 and the ambient atmosphere. The interior of feed hoppers 2 and 4 can, by respective pressure equalization devices 20 and 21, also be coupled to a source of pressurized gas 23. The pressurized gas delivered to the feed hoppers 2 and 4 via their respective equalization devices 20 and 21 may be either semi-purified furnace throat gas or an inert gas. As shown in FIG. 1, which is a typical installation, use is made of semi-purified furnace throat gas; the furnace throat gas passing through a purification apparatus and being thereafter delivered to the feed hoppers with very little loss of pressure.

Referring now to FIG. 2, the pressure equalization device 20 is depicted partly in section. Device 20 comprises a valve including a valve member 22 which is affixed to the end of an operating rod 24 for movement therewith as indicated by the double arrow in FIG. 2. Operation of valve member 22 between the closed position shown in solid lines and the open position shown by means of broken lines may, for example, be accomplished by use of the hydraulic control system of aforementioned U.S. Pat. No. 3,601,357. In the closed position the valve member 22 is in contact with a valve seat 26. The pressurized gas, for example from source 23, is delivered to the valve via a coupling flange and has been indicated by arrow A in FIG. 2.

Presuming that the feed hopper 2 of FIG. 1 has been refilled with charge material and the upper and lower sealing valves 10 and 8 closed, the interior of the hopper will be at atmospheric pressure. The pressure in the conduit upstream of valve member 22 may, for example, be approximately 2 kg/cm$^2$. In order to reduce the noise caused by expansion of the pressurized gas through the device at the moment the valve member 22 is moved away from valve seat 26, and in order to concentrate the erosion resulting from the particulate matter entrained in the pressurized gas at an easily accessible place where the resulting damage can be repaired without difficulty, the present invention contemplates the installation of a mechanism immediately downstream of the valve seat 26. This mechanism includes a movable tubular housing 28. Removably positioned within housing 28 are one or more disc-shaped elements 30; three such elements 30a, 30b, 30c being shown in FIG. 2. The elements 30, in the preferred embodiment, are provided with a plurality of perforations and occupy the entire cross-sectional area of the passage defined by housing 28. The elements 30 are positioned downstream of valve seat 26 at a point where the maximum turbulence can be expected during operation of the pressure equalization device. The elements 30 will be described in greater detail below in the discussion of FIGS. 4 through 6.

Figure 4:
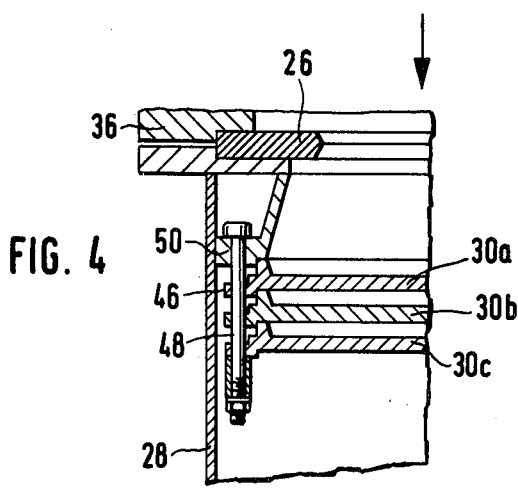
FIG. 4 is a partial cross-sectional view, on an enlarged scale, of the embodiment of the invention depicted in FIGS. 2 and 3.

Referring jointly to FIGS. 2 and 4, housing 28 has been designed in such a manner that it may be rotated out of the conduit in which the pressure equalizing valve is installed so as to give access to the disc members 30a, 30b and 30c and also to the valve seat 26 and the valve member 25. Housing 28 thus includes a lower flange 32 and an upper flange 34 which respectively interact to establish a fluid tight seal with a flange on the conduit system downstream of the valve and with a flange 36 which will be integral with the valve seat 26. Housing 28 moves about a pivot shaft 38 which is affixed to the exterior of the valve body. To release the housing 28 for movement, the connections between flanges 32 and 34 and their cooperating flanges are released or slackened and a suitable support means, not shown, is put into engagement with the underside of flange 36 in order to support and secure the upper portions of the pressure equalizing system. Thereafter, housing 28 is pivoted about shaft 38; typically through an angle of 180°. With housing 28 moved completely out of alignment with the fluid transmission system, the disc members 30a, 30b and 30c are easily accessible. It is also, at this time, possible to remove the valve seat 26 and, if deemed necessary or desirable subsequent thereto, to remove or service valve member 22 by moving it downwardly through the valve aperture.

The pressure equalization device depicted in FIG. 3 generally at 18 is employed to vent pressure within the feed hopper 4 to atmosphere. Pressure equalizing device 18 is identical to device 20 of FIG. 2 but, of course, is mounted in the opposite direction. Thus, as depicted in FIG. 3, the pivotal housing 28 of device 18 is above the actual valve since, as indicated by arrow B, the gas will escape from the feed hopper upon the opening of the pressure equalizing valve in the upward direction. The pressure equalization devices 21 and 16 are mounted in the same direction as valves 20 and 18 respectively.

Figure 5:
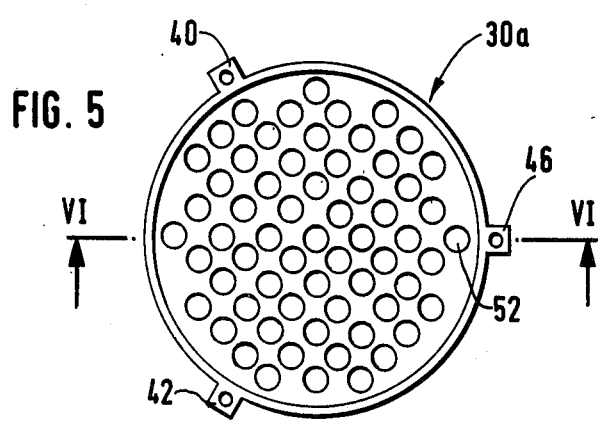
FIG. 5 is a plan view of one of the wear-absorbing elements shown in section in FIG. 4.
Figure 6:
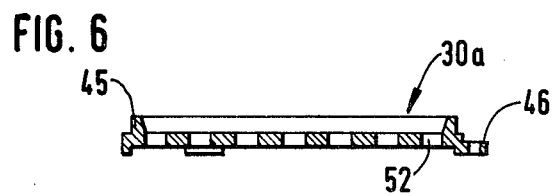
FIG. 6 is a cross-sectional view, taken along line VI—VI of FIG. 5, of the wear-absorbing element of FIG. 5.

Referring now to FIGS. 4–6 inclusive, the elements 30a, 30b and 30c are shown in detail as is the manner in which they are removably secured within the housing 28. As may best be seen from FIG. 5, the elements 30a, 30b and 30c are preferably in the form of perforated discs and each of these discs is provided with at least three apertured radial projections, such as projections 40, 42 and 46 on disc 30a, at its periphery. The perforations in disc 30a are indicated at 52; these perforations having been omitted from the showing of FIG. 4. Each of the discs is also provided with a raised rim 45. As shown in FIG. 4, the appropriate number of discs are stacked within housing 28 with the apertures in the peripheral radial projections being in alignment so that a bolt 48 may be passed through the aligned apertures and also through a support member 50 which is affixed to the inner wall of housing 28. The spacing between the discs is determined by the height of the rims 45. As installed within the housing 28, the discs are easily accessible and replaceable.

As previously noted, each of the discs 30 has a plurality of perforations 52. These perforations, in order to simplify the manufacturing process, will preferably be of cylindrical shape. Other shapes are, of course, possible. For maximum efficiency of operation, a plurality of discs should be employed and the perforations in adjacent discs should not be in alignment. Such an "offset" between the perforations in adjacent discs will cause the fluid passing through the device to follow zig-zag trajectories in order to pass through the perforated discs.

Particulate matter entrained with the gases passing through the pressure equalization devices will impact on the solid portions of the perforated discs 30 and the jet of gas expanding through each of the valves will be greatly reduced in speed and energy when passing through the discs whereby the erosive effects on the walls of conduits downstream of the equalizing devices is greatly reduced. The perforated discs are preferably formed of a very strong material, such as a manganese alloy steel. In addition to the ease of replacement of the discs 30, the present invention permits the wear of the discs to be easily inspected and the invention concentrates wear in a region where its effects are minimized and it is easy to repair. The subdivision of the jet of gas discharged through the valve of the pressure equalization device into a plurality of jets of smaller cross-section and lower energy significantly reduces the noise resulting from the expansion of the gases.

It is emphasized that the number of discs 30 and the manner in which their perforations are positioned and related disc-to-disc is variable. The principal requirement is that the number of discs and also their perforations should be such that the jet of fluid passing through the valve will be subdivided into small secondary jets which are caused to follow a zig-zag trajectory. The multiple discs 30 may, within the spirit and scope of the invention, be replaced by any other means which will achieve the same effect such as, for example, a stack of metallic balls.

Accordingly, while a preferred embodiment has been shown and described, various modifications and substitutions may be made thereto without departing from the spirit and scope of the invention and it will be understood that the present invenion has been described by way of illustration and not limitation.

What is claimed is:

1. In a pressure equalization system for use with a shaft furnace charging installation, the pressure equalization system including a valve and a tubular conduit in series relation to the valve and defining an axis, said tubular conduit providing for the flow of a stream of pressurized gas including entrained particulate material therethrough, the improvement comprising:
   a movable tubular housing, said tubular housing having an axis and defining a segment of the conduit, said movable tubular housing being pivotal with respect to the conduit to translate said housing axis in a direction transverse to the axis of the conduit to provide access to the interior of the housing; and
   disc means releasably positioned within said tubular housing for subdividing said stream of pressurized gas including entrained particulate material delivered thereto into a plurality of jets, said disc means being formed of a highly wear-resistant material and being impacted by the entrained particulate material when the stream of pressurized gas is delivered through the tubular housing to thereby reduce the speed and energy of the entrained particulate material and to reduce the wear on the portion of the conduit downstream of said disc means.

2. The apparatus of claim 1 wherein said disc means for subdividing the gas stream comprises:
   at least a pair of perforated discs mounted within said housing, the perforations in said discs being in a non-aligned relationship whereby the gas jets are caused to follow a non-linear trajectory.

3. The apparatus of claim 2 wherein said perforated discs are removably mounted in said housing in planes generally transverse to the axis of the conduit defined thereby.

4. The apparatus of claim 1 wherein said housing is pivotal about a vertical axis located to the exterior of said housing.

5. The apparatus of claim 3 wherein said housing is pivotal about a vertical axis located to the exterior of said housing.

6. A pressure equalization device for use with a shaft furnace charging installation of the type wherein a stream of pressurized furnace gases including entrained particulate material are circulated through the device, the device comprising:
   valve means;

tubular conduit means in series relation to said valve means, said tubular conduit means defining a fluid flow axis;

movable tubular housing means, said tubular housing means forming a segment of said tubular conduit means, said tubular housing means being mounted on a pivot axis which is parallel to the axis of the tubular conduit means and which is positioned externally to the conduit means to allow the tubular housing means to be pivoted out of alignment with the tubular conduit means to thereby provide access to the interior of the housing means; and disc means releasably positioned within said housing means for subdividing said stream of pressurized furnace gases into a plurality of jets, disc means being formed of a highly wear-resistant material and being impacted by the entrained particulate material when said stream of pressurized gas is delivered through the tubular housing means to thereby reduce the speed and energy of the entrained particulate material and to reduce erosion of the tubular conduit means downstream of the disc means.

7. The apparatus of claim 6 wherein said stream dividing disc means comprises at least a pair of perforated discs mounted within said housing, the perforations in said discs being in a non-aligned relationship whereby the gas jets are caused to follow a non-linear trajectory.

8. The apparatus of claim 7 wherein said perforated discs are removably mounted in said housing in planes generally transverse to the axis of the fluid conduit.

9. The apparatus of claim 1 wherein said disc means are perforated plates.

* * * * *